Figure 1:
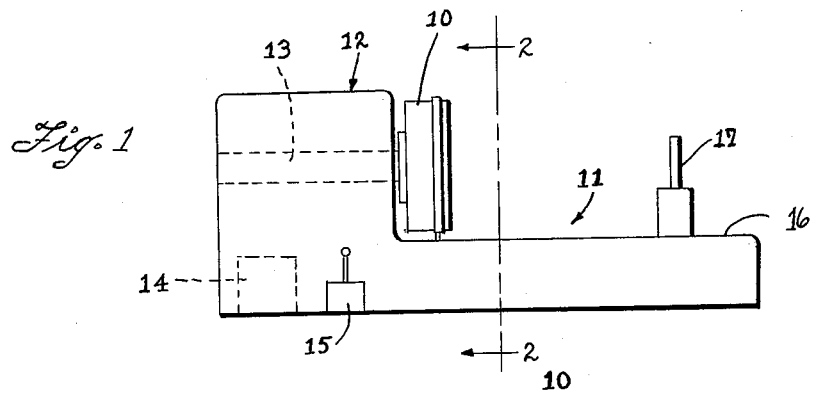

May 23, 1961 C. T. EVERETT 2,985,458
DEVICE FOR GRIPPING AND ROTATING A WORK PIECE
Filed July 9, 1958 5 Sheets-Sheet 1

INVENTOR.
Charles T. Everett
BY
Michael Williams
Attorney

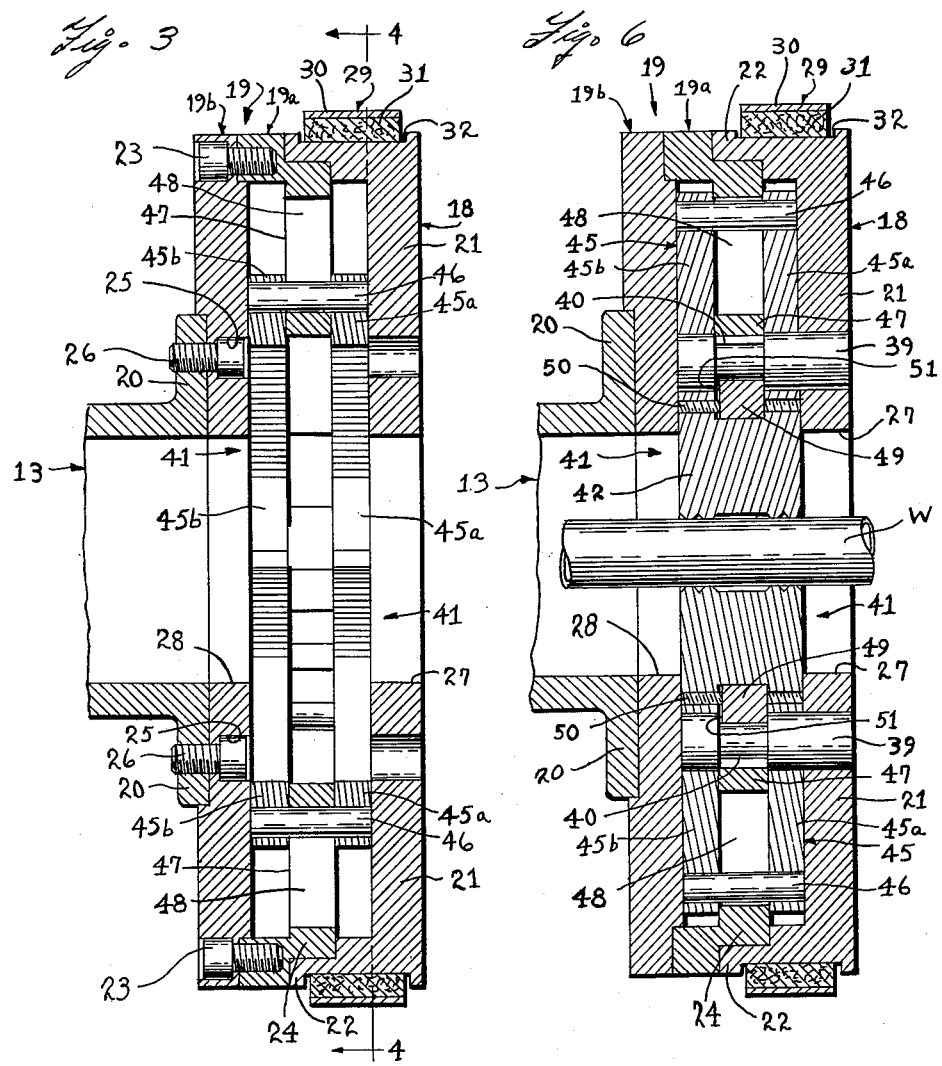

May 23, 1961 C. T. EVERETT 2,985,458
DEVICE FOR GRIPPING AND ROTATING A WORK PIECE
Filed July 9, 1958 5 Sheets-Sheet 3

INVENTOR.
Charles T. Everett
BY
Attorney

May 23, 1961 C. T. EVERETT 2,985,458
DEVICE FOR GRIPPING AND ROTATING A WORK PIECE
Filed July 9, 1958 5 Sheets-Sheet 4

INVENTOR.
*Charles T. Everett*
BY
*Attorney*

May 23, 1961 C. T. EVERETT 2,985,458
DEVICE FOR GRIPPING AND ROTATING A WORK PIECE
Filed July 9, 1958 5 Sheets-Sheet 5
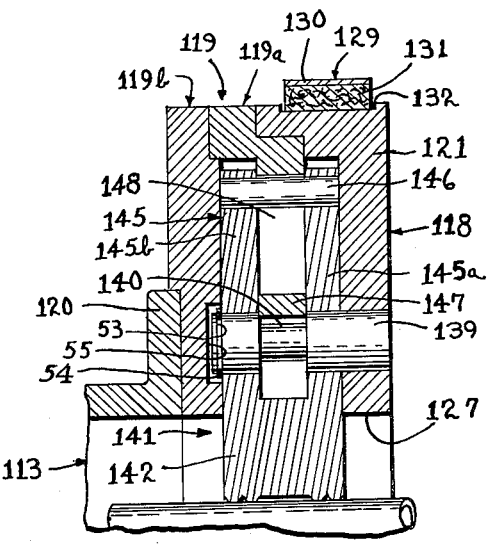
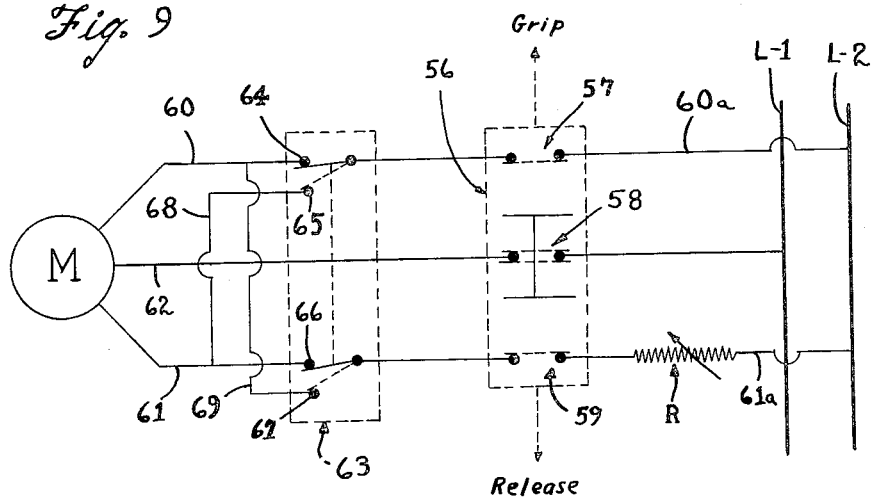
INVENTOR.
Charles T. Everett
BY
Attorney United States Patent Office 2,985,458
Patented May 23, 1961

2,985,458
DEVICE FOR GRIPPING AND ROTATING A WORK PIECE

Charles T. Everett, Warren, Ohio, assignor to Beaver Pipe Tools, Inc., Warren, Ohio Filed July 9, 1958, Ser. No. 747,450
6 Claims. (Cl. 279—106)

The present invention relates to a device for gripping and rotating a work piece, more particularly to a chuck which automatically grips a work piece of any size within its range for rotation in either direction and which automatically releases the work piece when it is to be removed from the chuck, and the principal object of the invention is to provide new and improved chucks of the character described.

Most chucks of the prior art have been of the type which require manual manipulation to cause them to grip or release the work. While it is true that certain large, automatic equipment has been provided with automatic chucks, these chuck constructions have been expensive and cumbersome and thus have achieved very limited usage despite the advantages possessed by a chuck of the automatic type.

The present invention provides an automatic chuck of relatively low cost which is extremely simple and trouble-free in operation and which, because of its unique principle of operation, may readily be adapted for use with apparatus using manual chucks. These and other advantages will readily become apparent from a study of following description and from the drawings appended hereto.

Figure 2:
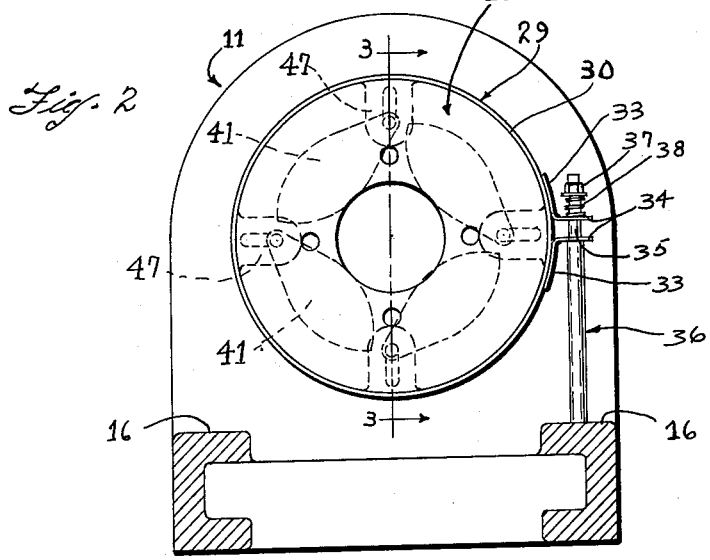
Figure 7:
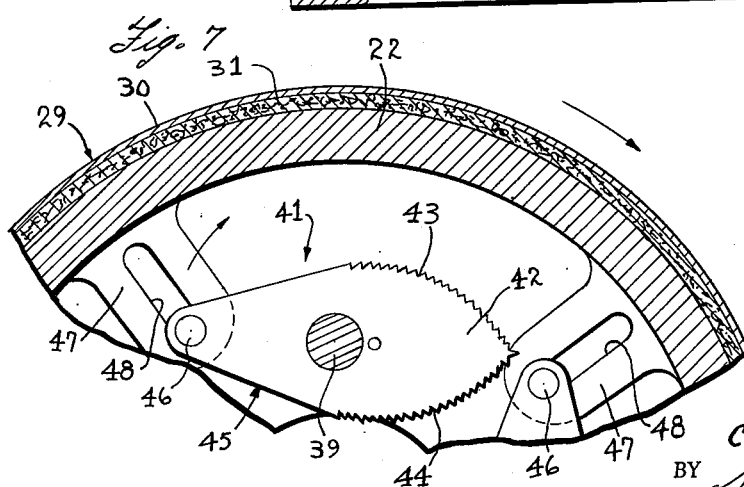
Figure 4:
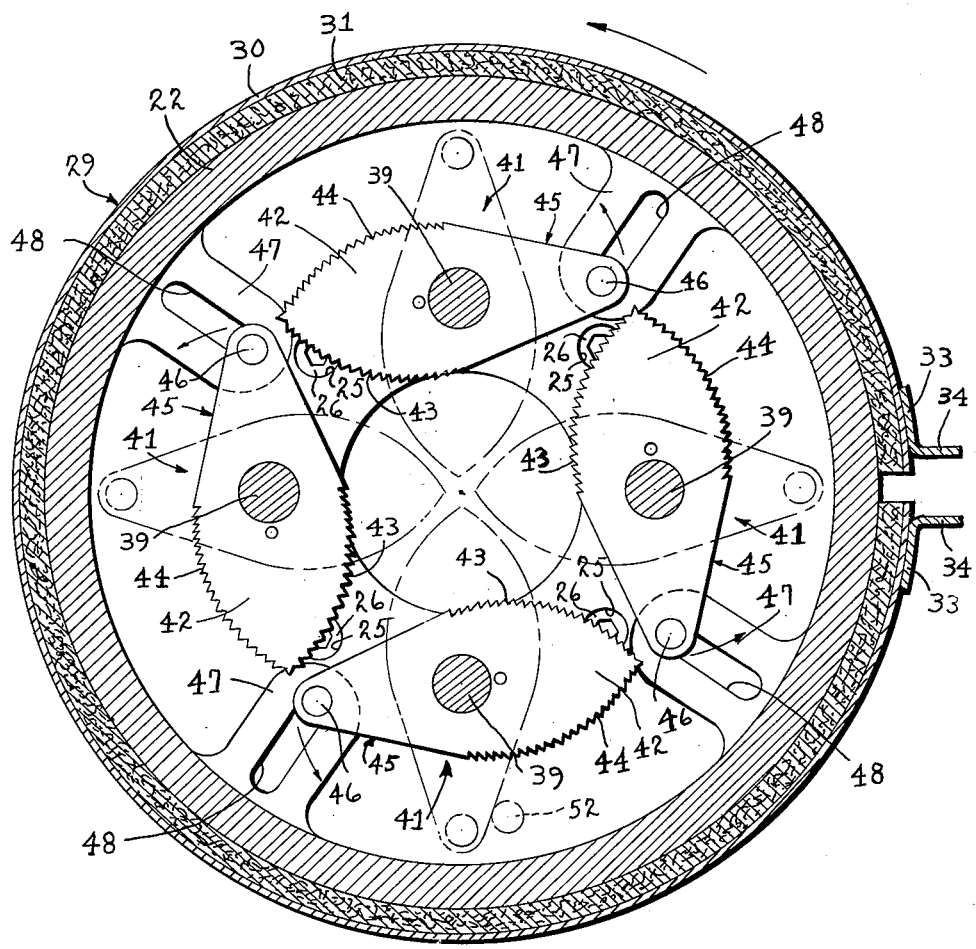
Figure 10:
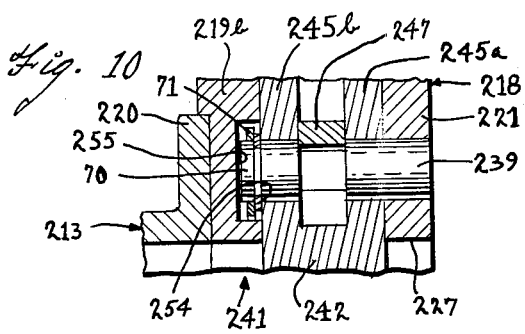
Figure 5:
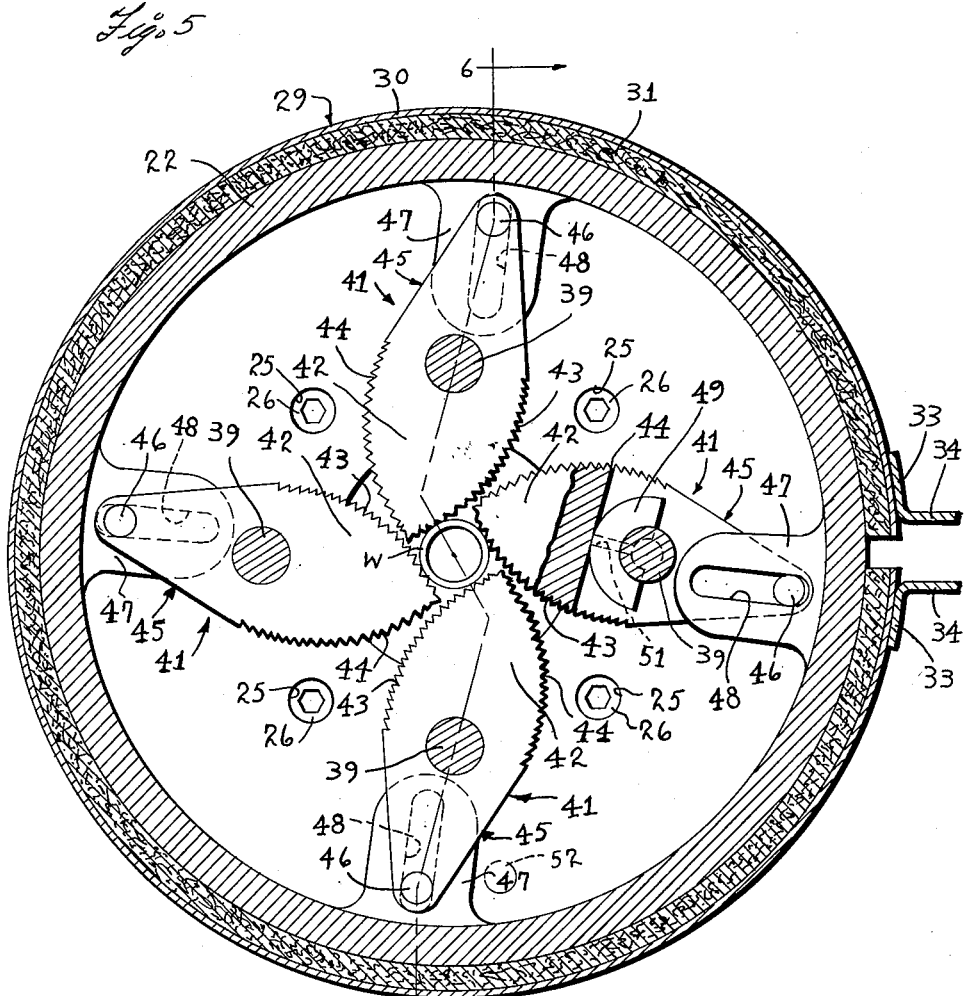
Figure 11:
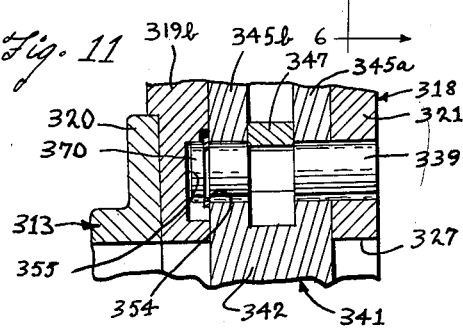

In the drawings accompanying this specification and forming a part of this application there is shown, for purpose of illustration, an embodiment which the invention may assume, and in these drawings:

Figure 1 is a side elevational view of apparatus embodying a chuck of the present invention, Figure 2 is an enlarged, sectional view generally corresponding to the line 2—2 of Figure 1, Figure 3 is an enlarged sectional view taken through the present invention and generally corresponding to the line 3—3 of Figure 2, Figure 4 is a sectional view generally corresponding to the line 4—4 of Figure 3, Figure 5 is a view similar to Figure 4 but with certain parts shown in another position, Figure 6 is a sectional view generally corresponding to the line 6—6 of Figure 5, Figure 7 is a fragmentary view similar to Figures 4 and 5 but with certain parts shown in still another position, Figure 8 is a fragmentary view similar to Figure 6 but of a somewhat modified construction, Figure 9 is a diagrammatic representation of a control circuit which may optionally be employed to control rotation of the machine spindle upon which the chuck of the present invention is mounted, Figure 10 is a fragmentary view similar to Figure 8 but of a modified construction, and Figure 11 is a view similar to Figure 10 but of a still further modified construction.

As previously mentioned, the present invention relates to a chuck for gripping and rotating a work piece and as seen in Figure 1, the present chuck 10 is shown associated with a conventional pipe lathe 11 or the like. Lathe 11 is of the usual type having a headstock 12 which rotatably supports the usual hollow spindle 13 to which the chuck is secured. A suitable electric motor 14 drives the spindle through suitable gearing or the like (not shown) and a suitable switch 15 is provided whereby the lathe operator may energize the motor to selectively drive the spindle in either direction. Lathe 11 has ways 16 along which are movable various types of tools 17 such as thread cutters, cut-offs and reamers and the like.

Since the lathe itself forms no part of the present invention, it is believed that a more detailed description thereof is unnecessary. Moreover, it is to be understood that the present invention is not limited to use with lathes but may be used with any suitable device having a rotatably mounted spindle.

Briefly, and as best seen in Figures 2 and 3, the chuck 10 of the present invention comprises a pair of members 18 and 19 secured to a flange 20 of spindle 13 and rotatable therewith about its axis. As herein shown, member 18 has a disk-like portion 21 and an axially extending, peripheral flange portion 22. For assembly purposes, member 19 is formed of two pieces 19a, 19b secured together by means of capscrews 23. Piece 19a is generally ring-like and has a reduced diameter portion 24 which slideably fits within an enlarged diameter portion of flange 22 of member 18. Piece 19b of member 19 is generally disk-like and has a plurality of counterbored apertures 25 in which are seated capscrews 26 which secure the chuck to the flange of the spindle. For a purpose to be seen, disk-like portion 21 of member 18 and piece 19b of member 19 are provided with respective central apertures 27, 28 which are aligned with the hollow spindle 13.

With the construction thus far described, composite member 19 is secured to and is directly rotatable with the spindle of the lathe. Member 18, however, is rotatably carried by member 19 and therefore member 19 may be rotated while member 18 remains stationary. In a manner to be disclosed, the above mentioned relative movement of members 18, 19 is employed to shift a plurality of work gripping jaws into and out of engagement with a work piece disposed therebetween.

Means are employed to yieldably resist rotation of member 18 with member 19 and as best seen in Figure 3, a suitable drag brake 29 is employed for this purpose. Referring to Figures 2 and 3, brake 29 comprises a split metal band 30 wrapped about member 18 and having suitable friction material 31 secured to its inner face. Band 30 fits within an annular groove 32 formed in the periphery of portion 22 of member 18 and suitably secured to the ends of the band are angles 33 which respectively provide spaced-apart, radially outwardly extending ears 34.

Ears 34 are provided with aligned apertures which pass the upper, reduced diameter portion 35 of an upstanding stud 36 whose lower end is suitably anchored in one of the ways 16 of the lathe. Portion 35 of the stud projects upwardly through ears 34 and its terminal end is threaded to receive a suitable nut 37. Interposed between nut 37 and the uppermost ear 34 is a suitable coil spring 38 and since the lowermost ear 34 rests upon the shoulder provided by the junction of the stepped diameter portions of the stud, compressing the spring by means of nut 37 urges the ears together and draws the band about the member to exert a braking force thereon. Obviously, the amount of braking force exerted by brake 29 may readily be adjusted by varying the compression of spring 38 by changing the position of nut 37.

As best seen in Figure 6, a plurality of pins 39 (herein shown to be four in number) are spaced radially about the axis of member 18 and are anchored thereto by welding or the like. These pins project rearwardly toward piece 19b of member 19 and their axes are parallel with the rotational axes of the members 18, 19. For a purpose to be disclosed, an intermediate portion of each pin 39 is provided with an annular groove 40.

Pivotally carried by each pin 39 (see especially Figures 4 and 5) is an elongated work gripping jaw 41 whose intermediate portion is bored to closely receive a respective pin. One end 42 of each jaw has arcuate work engaging faces 43, 44 which are provided with teeth for gripping the work piece and the other end 45 of each jaw carried a pin 46 for a purpose to be seen. As shown in Figures 5 and 6, the intermediate portion of each jaw and end 45 thereof are bifurcated to provide spaced ears 45a, 45b for reasons to appear.

Piece 19a of member 19 has four tongues 47 spaced radially thereof and extending radially inwardly toward its rotational axis. Tongues 47 are proportioned to slidably fit between ears 45a, 45b of respective jaws and each is provided with a slot 48 within which is closely receivable respective aforesaid pins 46.

Means are provided to retain jaws 41 assembled with pins 39 and in the present embodiment, a semi-circular retainer member 49 is disposed between respective jaw ears 45a, 45b and is seated in groove 40 of respective pins 39. To maintain each retainer member in place and prevent its rotation from the position seen in Figure 5 and consequent displacement from slot 40 of its pin, each jaw carries a setscrew 50 whose end is seated in a slot 51 formed in the retainer member. For a purpose to appear, a threaded aperture is provided in each side of the jaws for selectively receiving setscrew 50.

With the parts positioned as shown in Figure 4 wherein jaws 41 are in one of their extreme, maximum jaw opening positions, operation will be as follows: A work piece will be inserted into the chuck through aperture 27 in member 18. Motor 14 of the lathe will then be energized to rotate the chuck in the direction of the arrow in Figure 4. Upon initial rotation, member 18 will be held stationnary by the drag brake 29 and thus only member 19 will be rotated. Rotation of member 19, with member 18 held against rotation, will cause rotation of jaw ends 45 in the direction of the arrows about respective pins 39 and thus rotate jaws ends 42 in an arc to shift faces 43 thereof to gripping engagement with the work piece as shown in Figure 5. Continued rotation of chuck member 19 will overcome the drag of brake 29 and thus cause member 18 to rotate with member 19. With member 18 being rotated simultaneously with member 19 and with the jaws 41 in gripping engagement with the work piece, the latter will be rotated with the chuck. Note that since all of the jaws move simultaneously, the work piece will be automatically centered in the chuck.

When the work piece is to be removed from the chuck, it is only necessary to momentarily reverse the rotation of lathe motor 14 by means of the reversing switch 15. This will reverse the direction of rotation of member 19; however, member 18 will be held against reverse rotation therewith by drag brake 29. Upon relative rotation of members 18, 19 in the opposite direction from that heretofore described, jaws 41 will be rotated in an arc about respective pins 39 from the position shown in Figure 5 to the position shown in Figure 4. With the jaws once again disposed in their maximum open position shown in Figure 4, the work piece may readily be removed.

In the event it is desired to grip and rotate a work piece in the opposite direction from that above described and with the parts positioned as shown in Figure 4, motor 14 will be energized to rotate chuck member 19 in the direction of the arrow but without positioning the work piece within the chuck. Member 18 will be held by the drag brake against rotation and since there is no work piece to interrupt arcuate movement of the jaws, they will be swung beyond their intermediate position (seen in phantom lines in Figure 4) wherein they define a minimum jaw opening to the position shown in Figure 7, wherein they define a maximum jaw opening. Motor 14 may now be de-energized, a work piece inserted within the chuck as before described, and the motor reenergized in the opposite direction to rotate member 19 in the direction indicated by the arrow in Figure 7.

Since member 18 is held by the drag brake, jaws 41 will be swung about their pivots in the direction of the arrow until their faces 44 grip the work piece. Continued rotation of member 19 will overcome the drag of the brake and cause member 18 together with the jaws and the work piece to rotate as a unit with member 19. To remove the work piece, motor 14 will be momentarily reversed to return the jaws to the position shown in Figure 7. It will be evident that if the jaws are to be shifted from the position shown in Figure 7 to the position shown in Figure 4 when it is desired to once again grip and rotate a work piece as illustrated in Figure 5, it is only necessary to rotate member 19 in the direction of the arrow in Figure 7 without placing the work piece between the jaws. This will return the parts to the position seen in Figure 4 as will readily appear.

Since in many applications, a work piece will be gripped for rotation by jaw surfaces 43 as seen in Figure 5 far more frequently than it will be gripped by jaw surfaces 44, surfaces 43 will tend to wear to a much greater degree. When this occurs, it is a simple matter to reverse jaws 41, thus presenting the relatively unworn surfaces 44 for such frequent use. This reversal of the jaws is readily accomplished since they are symmetrical about their axes and since each setscrew 50 may be located on either side of its respective jaw.

As above mentioned, many applications will seldom require that the jaws 41 shift any further from the position shown in full lines in Figure 4 than the phantom line positions shown therein. Accordingly, to avoid confusing an operator who may be unfamiliar with the operation of the chuck in gripping and rotating a work piece in either direction, the disk-like portion 21 of member 18 may carry a screw 52 (shown in phantom lines in Figures 4 and 5) which projects inwardly of the chuck and into the path of one of the jaws 41 to prevent the latter from swinging beyond the phantom line position shown in Figure 4 to the position shown in Figure 7. In the event it is desired to render the chuck operable to rotate a work piece in either direction, screw 52 may readily be removed.

In the embodiment of the invention shown in Figure 8, construction and assembly of the chuck has been simplified by eliminating the semi-circular jaw retainer members 49 and instead holding the jaws in place upon their respective pivot pins by means of a conventional locking ring.

Referring to Figure 8 wherein similar parts are identified by the same reference characters as hereinbefore employed but prefixed by the digit 1, it will be noted that pins 139 have been lengthened so as to project slightly beyond the left sides (in the position of parts viewed) of the jaws 141. The projecting pin portions have an annular groove 53 formed therein in which is adapted to be seated a conventional snap ring 54 or the like. In order to provide the necessary clearance between piece 119b of member 119 and the projecting ends aforesaid of pins 139, the adjoining face of piece 119b may be provided with an annular groove 55 into which the pins project. Alternatively, each jaw would also have its opposite sides counterbored to permit installation of the snap ring. In such case, it would not be necessary to increase the length of pins 139 as will be understood. Obviously, with the elimination of retainer members 49, set screws 50 no longer have any function and such screws together with the tapped holes provided in the jaws for their reception may also be eliminated.

As previously mentioned, rotation of the lathe drive motor 14 and consequently the rotation of the lathe spindle 13 may be controlled by a conventional reversing switch 15 which, in center position de-energizes the motor, in one extreme position energizes it to rotate in one direction, and in its other extreme position energizes it to rotate in the opposite direction. While this conventional arrangement is generally satisfactory, the control arrangement seen in Figure 9 simplifies operation of the lathe and also reduces the possibility of premature motor failure caused by reversing lathe rotation without first allowing the lathe motor to come to rest or to at least slow down.

With reference to Figure 9, there is shown a drive motor M connected to power lines L–1 and L–2 through a conventional reversing switch 56 having contact pairs 57, 58 and 59. A conduit 60 leads from the motor to switch contact pair 57 and a conduit 60a leads from such contact pair to line L–2. A conduit 61 leads from the motor to switch contact pair 59 and a conduit 61a leads from such contact pair to line L–2. Interposed in conduit 61a for a purpose to appear is a suitable resistance R which may be of the adjustable type so that its resistance can be varied. A common conduit 62 leads from the motor to line L–1 through switch contact pair 58.

Interposed in conduits 60, 61 is a switch 63 having contacts 64, 65, 66 and 67. Contact 65 is connected to conduit 61 by means of a conduit 68 while contact 67 is connected to conduit 60 by means of a conduit 69. With the actuator (not shown) of switch 63 positioned to dispose its contact bridging members in the full line position shown, current may flow uninterruptedly along respective conduits 60, 61. If however, the actuator is moved to shift the contact bridging members to their dotted line positions, conduits 60, 61 will each be divided into respective right and left parts (with respect to the relation of the circuits as herein illustrated). Accordingly, when the contact bridging members of switch 63 are in their dotted line positions, current may flow along the right hand part of conduit 60 and the left hand part of conduit 61 via conduit 68. Current may also flow along the right hand part of conduit 61 and the left hand part of conduit 60 via conduit 69.

It is to be understood that when current flows to the motor from the power lines via conduit 62 and the left hand end of conduit 60, the motor will rotate in a direction to rotate the chuck 10 seen in Figure 2 in a counter-clockwise direction. Conversely, when current flows to the motor from the power lines via conduit 62 and the left hand end of conduit 61, the motor will rotate in the opposite direction to rotate the chuck in a clockwise direction.

Assuming that the chuck parts are positioned as seen in Figure 2 and that the switches 56, 63 are positioned as seen in full lines in Figure 9, it will be noted that the motor is deenergized. A workpiece may now be inserted in the chuck and the actuator (not shown) of switch 56 shifted to move its contact bridging members in the direction of the arrow labeled "grip." This will close contacts 57 and 58 and energize the motor via conduit 60a, the right and left hand ends of conduit 60, and conduit 62 to thus effect rotation of the chuck in a counterclockwise direction. As hereinbefore described, initial rotation will cause the chuck jaws to grip the workpiece and continued rotation will rotate the work-piece so that it may be threaded or the like.

When it is desired to remove the work-piece from the chuck, switch 56 will be shifted in the direction of the arrow labeled "release" to open contacts 57 and momentarily close contacts 59. This will energize the motor via conduits 61a, the right and left hand ends of conduit 61, and conduit 62 to momentarily rotate the chuck in a clockwise direction. Following momentary positioning of switch 56 in the position aforesaid, the switch will be returned by a centralizing spring if desired, to its full line position to de-energize the motor. As will be understood, the aforesaid momentary reversal of the chuck will open its jaws as seen in Figure 2 to thus permit removal of the work-piece.

The previously mentioned resistor R which is interposed in conduit 61a functions to limit current flow to the motor and thus effect its operation at a reduced speed. This reduces the shock load caused by a quick shifting of switch 56 from its "grip" position to its "release" position and therefore reduces wear on the motor and on the drive train connecting the motor to the spindle upon which the chuck is mounted.

In the event it is desired to grip and rotate a work-piece in clockwise direction (as viewed in Figure 2), switch 63 will be shifted to move its contact bridging members from the full line position shown in Figure 9 to the dotted line position therein shown. With no work-piece in the chuck, switch 56 will be momentarily shifted to "release" position. This will energize the motor via conduit 61a, the right hand end of conduit 61, conduit 69, the left hand end of conduit 60, and conduit 62 to cause momentary rotation of the chuck in a counter-clockwise direction. This momentary rotation will shift the chuck jaws from the position seen in Figure 2, through their intermediate position, to the position seen in Figure 7.

The work piece may now be inserted between the open chuck jaws and switch 56 moved to "grip" position. This will energize the motor via conduits 60a, the right hand end of conduit 60, conduit 68, the left hand end of conduit 61, and conduit 62 to thus cause rotation of the chuck in a clockwise direction to first grip the work piece and then effect its clockwise rotation. When it is desired to release the work piece, switch 56 will merely be momentarily shifted to "release" position to effect counter-clockwise rotation of the chuck to thus return its jaws to the open position seen in Figure 7. When it is desired to once again grip a work piece for counter-clockwise rotation, switch 63 will be returned to its full line position and switch 56 momentarily moved to "release" position. This will return the chuck jaws from the position seen in Figure 7 to the position seen in Figure 2.

It is to be noted that regardless of the position of switch 63, the motor will operate at a relatively high speed when switch 56 is moved to "grip" position and at a relatively low speed when the latter is moved to "release" position although the direction of rotation in respective said positions of switch 56 will depend upon the positionment of switch 63.

Under certain circumstances, especially when the chuck is of large size for gripping large work pieces for heavy machining operations, it is contemplated that since pins 39 are supported at but one end (that end which is anchored in chuck member 18) there may be some tendency for such pins to bend or deflect under load. To insure against any deflection of these pins, it is proposed to support their free ends as follows:

As seen in Figure 10 wherein similar parts are identified with the same reference characters as used heretofore but prefixed by the digit 2, pin 239 may carry a snap ring 254, similar to that seen in Figure 8. Pin 239 will, however, be even somewhat longer than the pin 139 seen in Figure 8 to provide a projecting portion 70 for a purpose to be seen. This construction is also similar to that seen in Figure 8 in that chuck member 219b has an annular groove 255 which provides clearance for the pins 239 and for a ring member about to be disclosed.

The means for supporting the free ends of the pins 239 comprises, in this embodiment, a ring member 71 having a plurality of apertures for closely receiving respective portions 70 of pins 239. As will be understood, ring member 71 will be fitted over pin portions 70 and will function to tie the free ends of the pins together so that they mutually support each other and thus insure against their radial outward reflection under load.

In the embodiment seen in Figure 11 wherein the parts are identified with the same reference characters as before but prefixed with the digit 3, the construction has been simplified by the omission of the previously disclosed ring member 65. Instead, there is provided in chuck piece 319b an annular groove 355 whose outer defining wall engages respective portions 370 of pins 339. With the free ends of each of the pins engaged with the groove wall aforesaid, it will be evident that the free ends of the pins will thereupon be supported against radial outward deflection.

In view of the foregoing, it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A rotatably mounted chuck for gripping and rotating a work piece, comprising a drive member and driven member rotatable together about a common axis and also rotatable relative to each other about said axis, a plurality of jaws shiftably carried by one of said members and responsive to relative member rotation and being shiftable toward gripping engagement with the work piece upon relative member rotation in one direction and shiftable away from gripping engagement with the work piece upon relative member rotation in the opposite direction, and control means in one position effecting rotation of said drive member in said one direction at relatively high speed and in another position effecting rotation of said drive member in the opposite direction at relatively low speed.

2. A rotatably mounted chuck for gripping and rotating a work piece, comprising a drive member and driven member rotatable together about a common axis and also rotatable relative to each other about said axis, a plurality of jaws shiftably carried by one of said members and responsive to relative member rotation and being shiftable toward gripping engagement with the work piece upon relative member rotation in one direction and shiftable away from gripping engagement with the work piece upon relative member rotation in the opposite direction, a first control in one position effecting rotation of said drive member in said one direction and in another position effecting rotation of said drive member in the opposite direction, and a second control for selectively reversing operation of said first control to effect rotation of said drive member in said opposite direction when said first control is in said one position and rotation of said drive member in said one direction when said first control is in said other position.

3. A rotatably mounted chuck for gripping and rotating a work piece, comprising a drive member and driven member rotatable together about a common axis and also rotatable relative to each other about said axis, a plurality of jaws shiftably carried by one of said members and responsive to relative member rotation and being shiftable toward gripping engagement with the work piece upon relative member rotation in one direction and shiftable away from gripping engagement with the work piece upon relative member rotation in the opposite direction, a first control in one position effecting relatively high speed rotation of said drive member in said one direction and in another position effecting relatively low speed rotation of said drive member in the opposite direction, and a second control for selectively reversing operation of said first control to effect relatively high speed rotation of said drive member in said opposite direction when said first control is in said one position and relatively low speed rotation of said drive member in said one direction when said first control is in said other position.

4. A rotatably mounted chuck for gripping and rotating a workpiece, comprising a drive member and a driven member rotatable together about a common axis and also relative to each other about said axis and said members being disposed in axially spaced, side by side relation, and a plurality of work gripping jaws disposed between and pivotally secured to said members and retaining them against axial separation, said jaws shifting about their pivots transversely of said axis toward and away from a workpiece disposed between said jaws upon relative member rotation in one direction or the other.

5. The construction of claim 4 and further comprising means in part carried by respective members and in part provided by said jaws, said member parts interengaging with said jaw parts to retain said members against axial separation.

6. A rotatably mounted chuck for gripping and rotating a workpiece, comprising a drive member and a driven member rotatable together about a common axis and also rotatable relative to each other about said axis, a plurality of first pins carried by and rotatable with one of said members and extending parallel to and spaced radially about said axis, a plurality of slotted tongues fixedly carried by one of said members and spaced radially about and extending radially inwardly toward said axis, a plurality of jaws in the form of elongated links each having an intermediate portion pivoted on a respective first pin, a first end portion adapted to extend radially outwardly of said axis and having a pair of spaced ears for receiving respective tongues therebetween, and a second end portion adapted to extend radially inwardly toward said axis and swingable in an arc about its pin toward and away from gripping engagement with the workpiece, a second pin carried by and extending between each jaw ear pair for movement in an arcuate path with its jaw about a respective first pin and passing through the slot of a respective tongue to pivotally connect each first jaw end portion to a respective tongue; and means engaged with said driven member and yieldably opposing rotation thereof with said drive member upon rotation of the latter to thereby effect relative member rotation in one direction or the other, and consequent swinging movement of said jaws about respective first pins, depending upon the direction of rotation of said drive member.

References Cited in the file of this patent

UNITED STATES PATENTS

| | | |
|---|---|---|
| 1,095,304 | Weiss | May 5, 1914 |
| 2,460,254 | Greer | Jan. 25, 1949 |
| 2,479,560 | Eaton | Aug. 23, 1949 |
| 2,593,706 | Von Zelewsky | Apr. 22, 1952 |
| 2,613,564 | Walraven et al. | Oct. 14, 1952 |
| 2,627,195 | Sporket | Feb. 3, 1953 |
| 2,762,630 | Coniglio | Sept. 11, 1956 |